US006634648B1

(12) United States Patent
Rockwell

(10) Patent No.: US 6,634,648 B1
(45) Date of Patent: Oct. 21, 2003

(54) SHIELD AND SEAL ASSEMBLY FOR VEHICLE WHEEL END ASSEMBLY

(75) Inventor: Todd K. Rockwell, South Lyon, MI (US)

(73) Assignee: Kelsey-Hayes Company, Livonia, MI (US)

( * ) Notice: Subject to any disclaimer, the term of this patent is extended or adjusted under 35 U.S.C. 154(b) by 81 days.

(21) Appl. No.: 09/607,068

(22) Filed: Jun. 29, 2000

(51) Int. Cl.$^7$ ................................................ F16J 15/32
(52) U.S. Cl. ..................... 277/572; 277/560; 277/566
(58) Field of Search ................................. 277/560, 561, 277/562, 572, 575, 566, 375; 384/484, 486–8

(56) References Cited

U.S. PATENT DOCUMENTS

| 3,482,844 A | * | 12/1969 | McKinven, Jr. |
| 4,114,898 A | * | 9/1978 | Bainard et al. |
| 4,325,591 A | * | 4/1982 | Otto |
| 4,432,557 A | * | 2/1984 | Drucktenhengst |
| 4,981,303 A | * | 1/1991 | Matsushima et al. |
| 4,991,982 A | * | 2/1991 | Colanzi et al. |
| 5,149,207 A | * | 9/1992 | Vignoito ..................... 384/478 |
| 5,183,269 A | * | 2/1993 | Black et al. |
| 5,201,529 A | * | 4/1993 | Heinzen |
| 5,553,866 A | * | 9/1996 | Heinzen |
| 5,887,875 A | * | 3/1999 | Salciccioli et al. |
| 5,908,249 A | * | 6/1999 | Nisley et al. |
| 6,062,571 A | * | 5/2000 | Hintenlang |
| 6,186,507 B1 | * | 2/2001 | Oldenburg |
| 6,302,404 B1 | * | 10/2001 | Bundgart |

* cited by examiner

Primary Examiner—Anthony Knight
Assistant Examiner—Alison K. Pickard
(74) Attorney, Agent, or Firm—MacMillan, Sobanski & Todd, LLC

(57) ABSTRACT

A shield and seal assembly adapted for use in a wheel end assembly of a vehicle includes a generally non-flexible shield and a generally flexible seal integrally molded in situ with the shield. The shield includes a first leg, a second leg, a third leg, a fourth leg, and a fifth leg. The first leg extends in a generally radially outwardly extending direction, the second leg extends in a generally radial direction, the third leg extends in a generally axial direction, the fourth leg extends in a generally axial direction, and the fifth leg extends in a generally radial direction. The seal includes a first end portion, a second end portion, and an intermediate body connecting the first end portion and the second end portion together. The first end portion defines a grease lip of the seal, and the second end portion defines a first dust lip of the seal. The body further includes a generally radially inwardly extending portion which defines a second dust lip of the seal, and an outer portion having an annular groove provided therein. The fifth leg of the shield includes an end portion adapted to be disposed in the groove during the molding process.

16 Claims, 9 Drawing Sheets

US 6,634,648 B1

SHIELD AND SEAL ASSEMBLY FOR VEHICLE WHEEL END ASSEMBLY

BACKGROUND OF THE INVENTION

The subject invention relates to in general to vehicle wheel end assemblies and in particular to an improved shield and seal assembly for use in such a vehicle wheel end assembly.

A portion of a prior art wheel end assembly, indicted generally at 600, is illustrated in prior art FIG. 10. As shown therein, the prior art wheel end assembly 600 includes a prior art casing and seal assembly, indicated generally at 602. The vehicle wheel end assembly 600 is associated with a front left wheel (not shown) of a front wheel non-drive vehicle and includes a unicast hub and disc brake rotor 604, a steering knuckle 606, a pair of bearings (only one of the pair of bearings 608 being illustrated), and a wheel spindle 610.

The unicast hub and rotor 604 includes a wheel hub 612 provided with a centrally located wheel spindle receiving bore 614 formed therein. The bore 614 is of a stepped configuration and includes an inner opened end 616 and an outer opened end (not shown). A first generally cylindrical surface or annular groove 618 is formed adjacent the inner end 616, a second generally cylindrical surface 620 is formed adjacent the first cylindrical surface 618. The first cylindrical surface 618 defines a seat for the casing and seal assembly 602, and the second cylindrical surface 620 defines a bearing seat surface for receiving the inner bearing 608. The wheel spindle 610 includes an flanged inner end 622 and an opposed threaded outer end (not shown). The wheel spindle 610 extends through an opening 624 provided in the steering knuckle 606 and through the bore 614 of the wheel hub 612.

As shown in prior art FIG. 11, the prior art casing and seal assembly 602 includes a generally non-flexible casing 630 and a generally flexible seal 632. The casing 630 is formed from a relatively non-flexible or rigid material, such as for example, steel. If so desired, the casing 630 can be coated with an anti-corrosive outer layer of material, such as for example, gold bond or galvanizing. The casing 630 includes a first leg 640, a second leg 642, a third leg 644, and a fourth leg 646. The first leg 640 extends in a generally radial direction, the second leg 642 extends in a generally axial direction, the third leg 644 extends in a generally axial direction, and the fourth leg 646 extends in a generally radial direction. The first leg 640 and the fourth leg 646 are generally parallel to one another, and the second leg 642 and the third leg 644 are generally parallel to one another and perpendicular to the first leg 640 and the fourth leg 646.

The seal 632 is formed from a generally flexible material, such as for example, an elastomeric material. The seal 632 includes a first end portion 650, a second end portion 652, and an intermediate body 654 connecting the first end portion 650 and the second end portion 652 together. The first end portion 650 defines a grease lip of the seal 632, and the second end portion 652 defines a first dust lip of the seal 632. The body 654 further includes a generally radially inwardly extending portion 656 which defines a second dust lip of the seal 632, and an outer portion 658 having an annular groove or recess 660 provided therein. An end portion 648 of the fourth leg 646 of the casing 630 is disposed in the recess 660 of the casing 630. To accomplish this, the seal 632 is typically molded in situ with the casing 630. As shown in prior art FIG. 10, the casing and seal assembly 602 is disposed in the first cylindrical surface 618 of the wheel hub 612 of the wheel end assembly 600. When assembled, the grease lip 650 is disposed in contact with an adjacent surface 660 of the steering knuckle 606 to keep grease in the bearing area of the wheel end assembly 600, and the first dust lip 652 and the second dust lip 656 are in contact with the adjacent surface 660 of the steering knuckle 606 to prevent debris, such as mud, dirt, water, etc., from entering from the outside into the bearing area of the wheel end assembly 600.

SUMMARY OF THE INVENTION

This invention relates to a shield and seal assembly adapted for use in a wheel end assembly of a vehicle and includes a generally non-flexible shield and a generally flexible seal integrally molded in situ with the shield. The shield includes a first leg, a second leg, a third leg, a fourth leg, and a fifth leg. The first leg extends in a generally radially outwardly extending direction, the second leg extends in a generally radial direction, the third leg extends in a generally axial direction, the fourth leg extends in a generally axial direction, and the fifth leg extends in a generally radial direction. The seal includes a first end portion, a second end portion, and an intermediate body connecting the first end portion and the second end portion together. The first end portion defines a grease lip of the seal, and the second end portion defines a first dust lip of the seal. The body further includes a generally radially inwardly extending portion which defines a second dust lip of the seal, and an outer portion having an annular groove provided therein. The fifth leg of the shield includes an end portion adapted to be disposed in the groove during the molding process.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
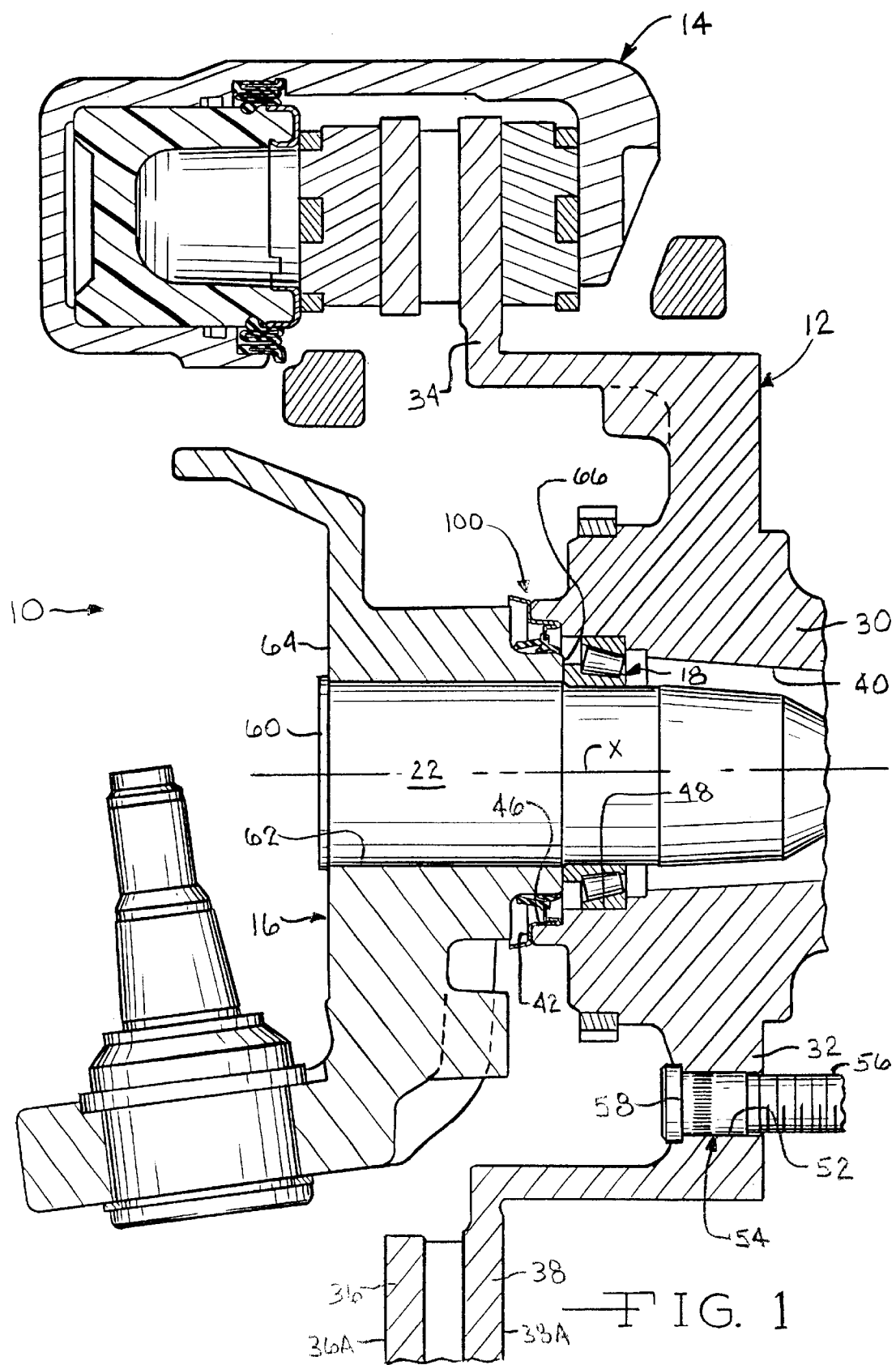
FIG. 1 is a sectional view of portion of a vehicle wheel end assembly including a first embodiment of a shield and seal assembly in accordance with the present invention.

Referring to FIG. 1, there is illustrated a first embodiment of a vehicle wheel end assembly, indicted generally at 10, including a first embodiment of a shield and seal assembly, indicated generally at 100, in accordance with the present invention is illustrated. The vehicle wheel end assembly 10 is associated with a front wheel non-drive vehicle and includes a unicast hub and disc brake rotor 12, a disc brake caliper assembly 14, a steering knuckle 16, a pair of bearings (only one of the pair of bearings 18 being illustrated), and a wheel spindle 22. The general structure and operation of the vehicle wheel end assembly 10 is conventional in the art. Thus, only those portions of the wheel end assembly 10 which are necessary for a full understanding of this invention will be explained and illustrated in detail. Although this invention will be described and illustrated in conjunction with the particular vehicle wheel end assembly 10 disclosed herein, it will be appreciated that this invention may be used in conjunction with other kinds of wheel end assemblies.

The unicast hub and rotor 12 defines an axis X and includes an axially extending wheel hub 30, a generally radially extending mounting portion 32, and a radially extending brake disc 34. The illustrated brake disc 34 includes a pair of spaced apart brake friction plates 36 and 38 having opposed parallel brake friction surfaces 36A and 38A, respectively. Alternatively, the construction of the brake disc 34 can be of other than illustrated if so desired.

The wheel hub 30 is provided with a centrally located wheel spindle receiving bore 40 formed therein. The bore 40 is of a stepped configuration and includes an inner opened end 42 and an outer opened end (not shown). A first generally cylindrical surface or annular groove 46 is formed adjacent the inner end 42, a second generally cylindrical surface 48 is formed adjacent the first cylindrical surface 46, and a third generally cylindrical surface (not shown) is formed adjacent the inner end of the bore 40. The first cylindrical surface 46 defines a seat for the shield and seal assembly 100 of the present invention, the second cylindrical surface 48 defines a bearing seat surface for receiving the inner bearing 18, and the third cylindrical surface defines a bearing seat surface for receiving the outer bearing. The bearings 18 and 20 are effective to surround and rotatably support the wheel hub 30 between the opposed ends thereof relative to the steering knuckle 16.

The mounting portion 32 of the integral hub and rotor 12 includes a plurality of non-threaded lug bolt receiving holes 52 formed therethrough (only one of the lug bolt receiving holes 52 being illustrated), equally spaced circumferentially about the bore 40. A lug bolt 54 having a threaded outer end 56 and an enlarged head 58 is disposed in each of the lug bolt receiving holes 52 for mounting a vehicle wheel (not shown) on the unicast hub and rotor 12. A threaded lug nut (not shown) is installed on the threaded outer end 56 of each lug bolt 54 and tightened to secure the vehicle wheel to the integral hub and rotor 12. Alternatively, the construction of the unicast hub and rotor 12 and/or the pair of bearings can be other than illustrated if so desired. Also, while the hub and rotor 12 is illustrated as being a unicast hub and rotor 12, the invention can be used with non-unicast types of designs.

The wheel spindle 22 includes a flanged inner end 60 and an opposed threaded outer end (not shown). The wheel spindle 22 is pressed into and extends through an opening 62 provided in the steering knuckle 16 and through the bore 40 of the wheel hub 30. As shown in FIG. 1, the flanged inner end 60 of the wheel spindle 22 is of a larger diameter than the opening 62 of the steering knuckle 16. A washer and nut or other suitable fastening member (not shown) is installed on the threaded outer end of the wheel spindle 22 and tightened to pull the integral hub and rotor 12 to the steering knuckle 16 and thereby secure the steering knuckle 16 to the integral hub and rotor 12. At the same time, an inner surface 66 of the steering knuckle 16 engages an adjacent surface of the inner race of the bearing 18 to apply a predetermined preload or endplay to the bearing 18. A ball joint 68 carried by the steering knuckle 16 is provided to connect the steering knuckle 16, and therefore the wheel end assembly 10, to a component (not shown) of the vehicle (not shown). Alternatively, the construction of the wheel end assembly 10 can be other than illustrated if so desired.

Figure 2:
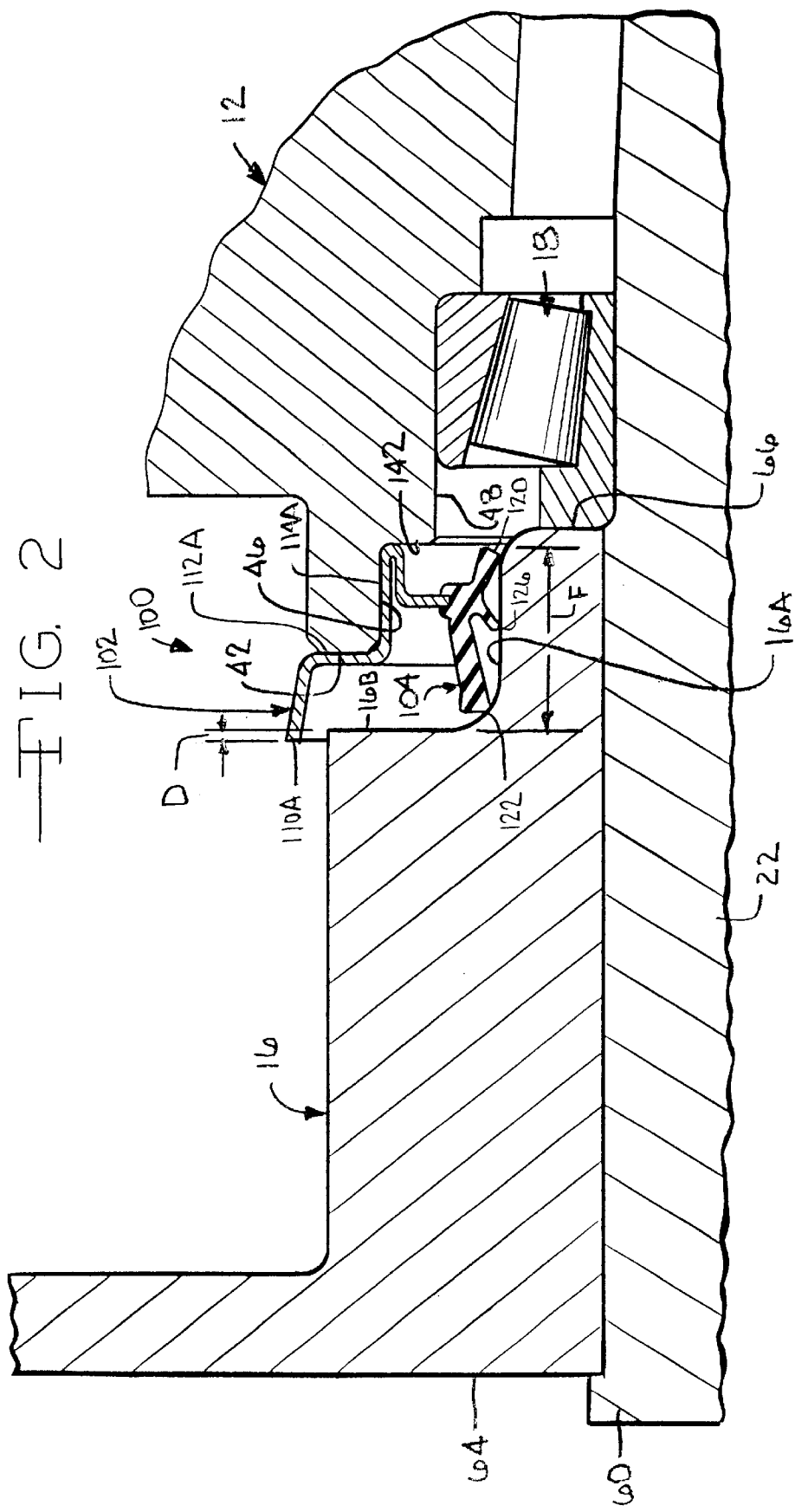
FIG. 2 is a enlarged sectional view of a portion of the vehicle wheel end assembly illustrated in FIG. 1.
Figure 3:
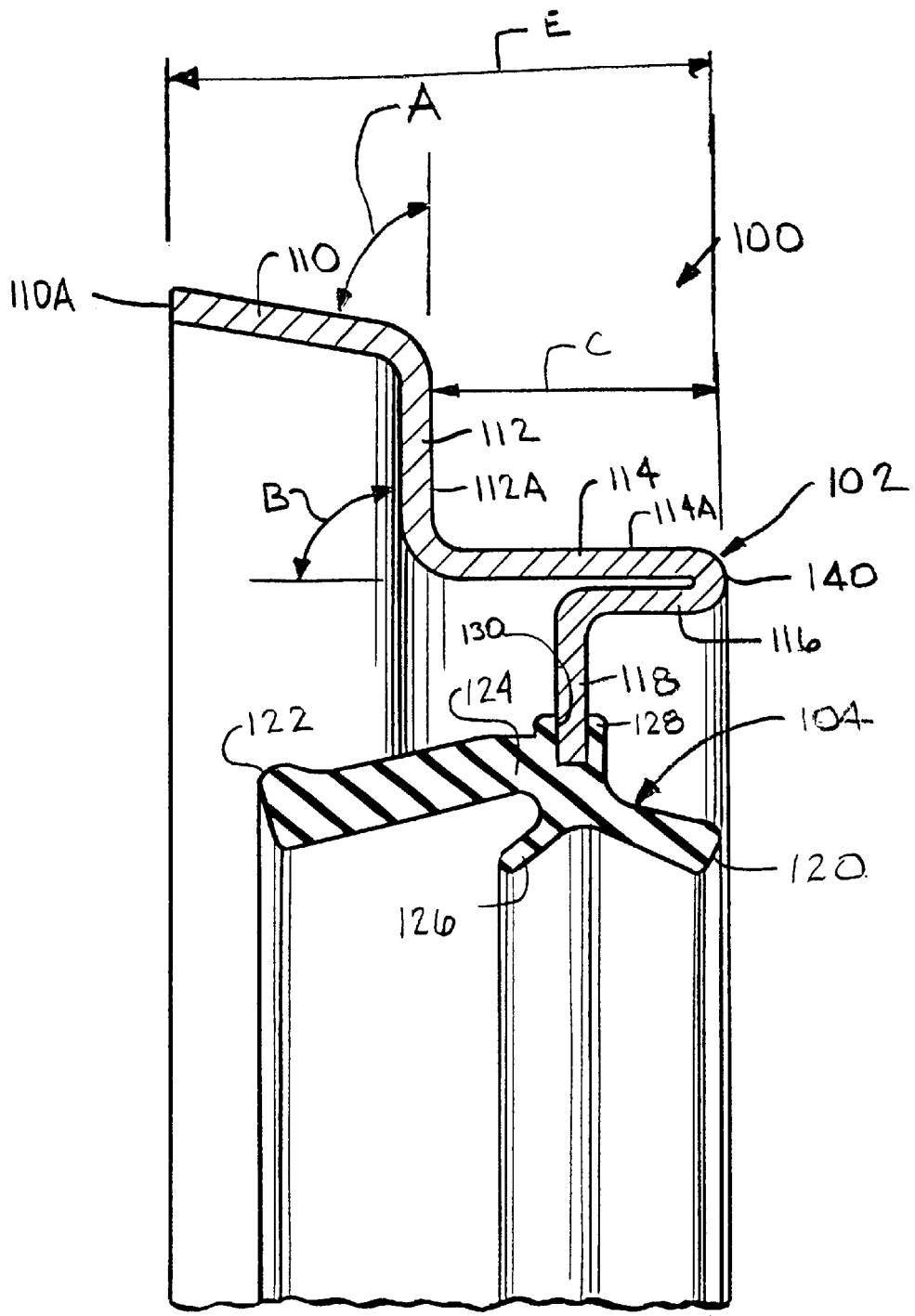
FIG. 3 is an enlarged sectional view of the shield and seal assembly illustrated in FIGS. 1 and 2.

Turning now to FIGS. 2 and 3, the shield and seal assembly 100 of the present invention will be discussed. As shown therein, the shield and seal assembly 100 includes a generally non-flexible shield 102 and a generally flexible seal 104 which are secured together during a molding process. The shield 102 is formed from a relatively non-flexible or rigid material, such as for example, steel. If so desired, the shield 102 can be coated with an anti-corrosive outer layer of material, such as for example, gold bond or galvanizing. Alternatively, the shield 102 can be formed from other materials, such as for example, stainless steel, aluminum and titanium.

As best shown in FIG. 3, the shield 102 includes a first leg 110, a second leg 112, a third leg 114, a fourth leg 116, and a fifth leg 118. The first leg 110 extends in a generally radially outwardly extending direction, the second leg 112 extends in a generally radial direction, the third leg 114 extends in a generally axial direction, the fourth leg 116 extends in a generally axial direction, and the fifth leg 118 extends in a generally radial direction. In the illustrated embodiment, the first leg extends at an angle A relative to the second leg 112, the second leg 112 extends at an angle B relative to the third leg 114, the third leg 114 and the fourth leg 116 are generally parallel to one another, and the fifth leg 118 and the second leg 112 are generally parallel to one another. The angle A is in the range from about 80 degrees to about 90 degrees and preferably (as illustrated) is approximately 85 degrees. The angle B is approximately 90 degrees. The third leg 114 defines a generally axial distance C. Alternatively, the construction of the shield 102 can be other than illustrated if so desired.

The seal 104 is formed from a generally flexible material, such as for example, an elastomeric material. More preferably the seal 104 is formed from nitrile rubber, which is commercially available from Chicago Rawhide Corporation, of Elgin, Ill., under the name of HMADL16. The seal 104 includes a first end portion 120, a second end portion 122, and an intermediate body 124 connecting the first end portion 120 and the second end portion 122 together. The first end portion 120 defines a grease lip of the seal 104, and the second end portion 122 defines a first dust lip of the seal 104. The body 124 includes a generally radially inwardly extending portion 126 which defines a second dust lip of the seal 104, and an outer portion 128 having an annular groove or recess 130 provided therein. An end portion 132 of the fifth leg 118 of the shield 102 is disposed in the recess 130 of the shield 102. Alternatively, other constructions can be used to secure the shield 102 and the seal 104 together.

As best shown in FIG. 2, the shield and seal assembly 100 is disposed in the first cylindrical surface 46 of the wheel hub 30 of the wheel end assembly 10. In particular, an inner surface 114A of the third leg 114 of the shield 102 is disposed adjacent the first cylindrical surface 46, an inner surface 112A of the first leg 112 of the shield 102 is disposed adjacent the inner opened end 42 of the wheel hub 30, and portions of the inner leg 120, the outer leg 122, and the intermediate leg 124 of the seal 104 are disposed in contact with a generally cylindrical surface 16A of the steering knuckle 16.

Also, as best shown in FIG. 2, an axial endmost surface 110A of the first leg 110 of the shield 102 extends a predetermined axial distance D from a surface 16B of the steering knuckle 16. To accomplish this, as shown in FIG. 3, the endmost surface 110A is spaced from a surface 140 of the shield 102 a predetermined distance E which is greater than a predetermined distance defined between the surface 16B of the steering knuckle 16 and a surface 142 of the bore 40 of the wheel hub 30.

Figure 4:
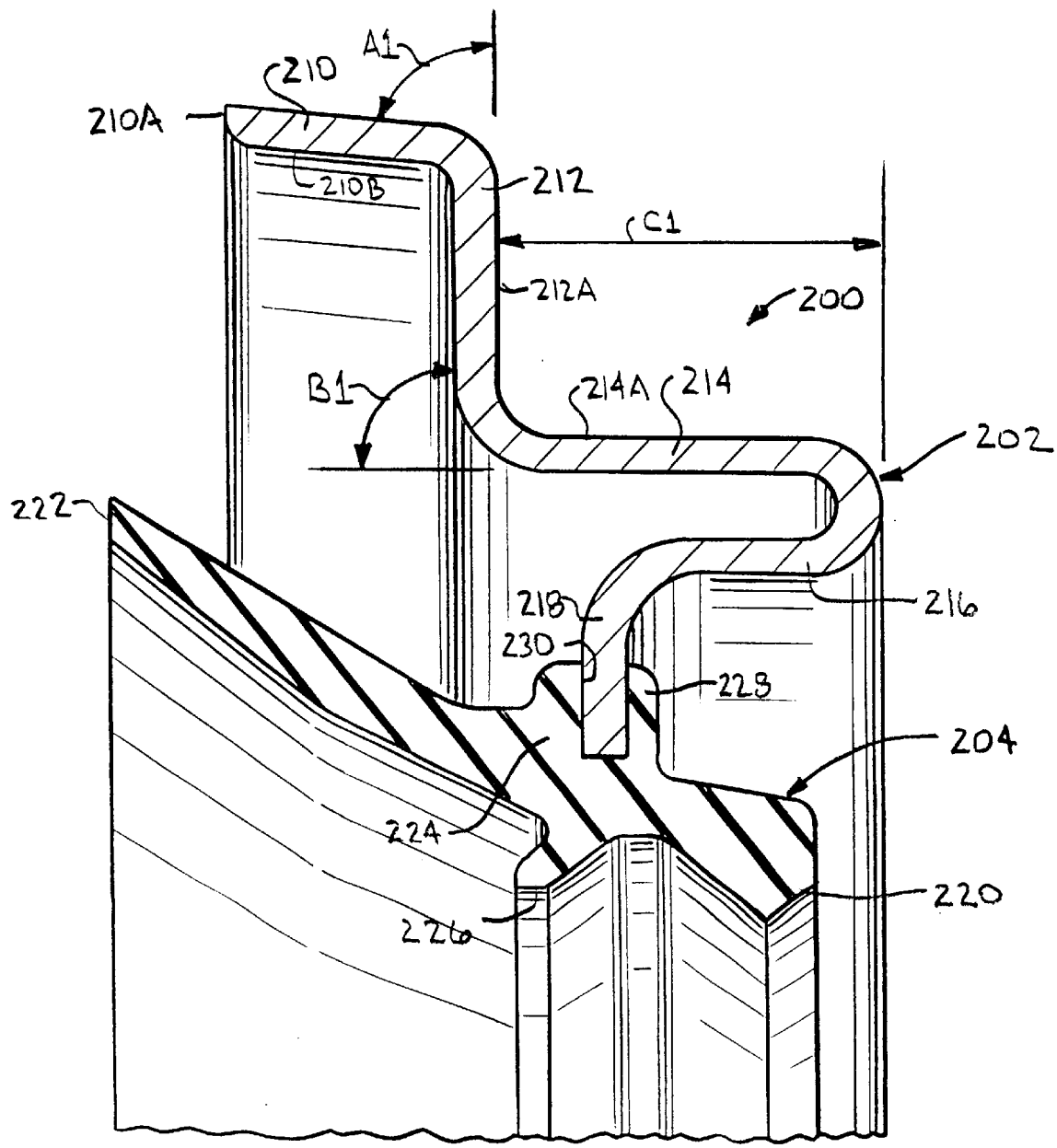
FIG. 4 is an enlarged sectional view of a second embodiment of a shield and seal assembly in accordance with the present invention.
Figure 5:
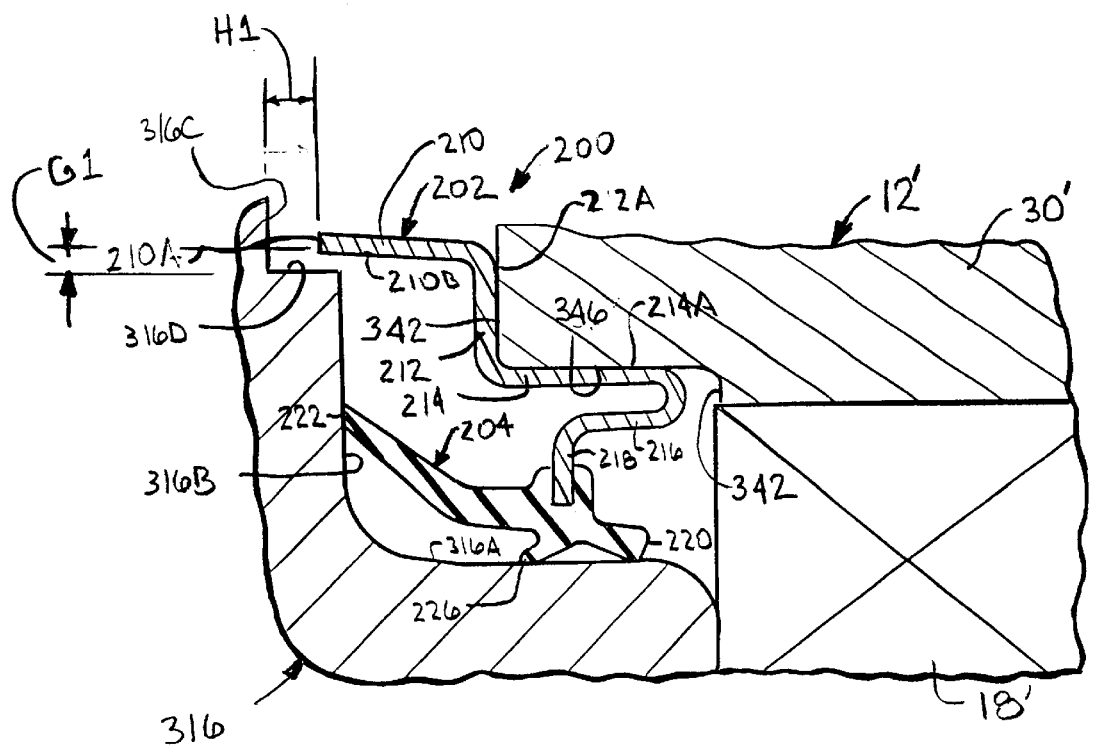
FIG. 5 is an enlarged sectional view of a portion of a vehicle wheel end assembly including the shield and seal assembly illustrated in FIG. 4, showing the deflection of shield and seal assembly when the wheel end assembly is in a minimum deflection of lip position.
Figure 6:
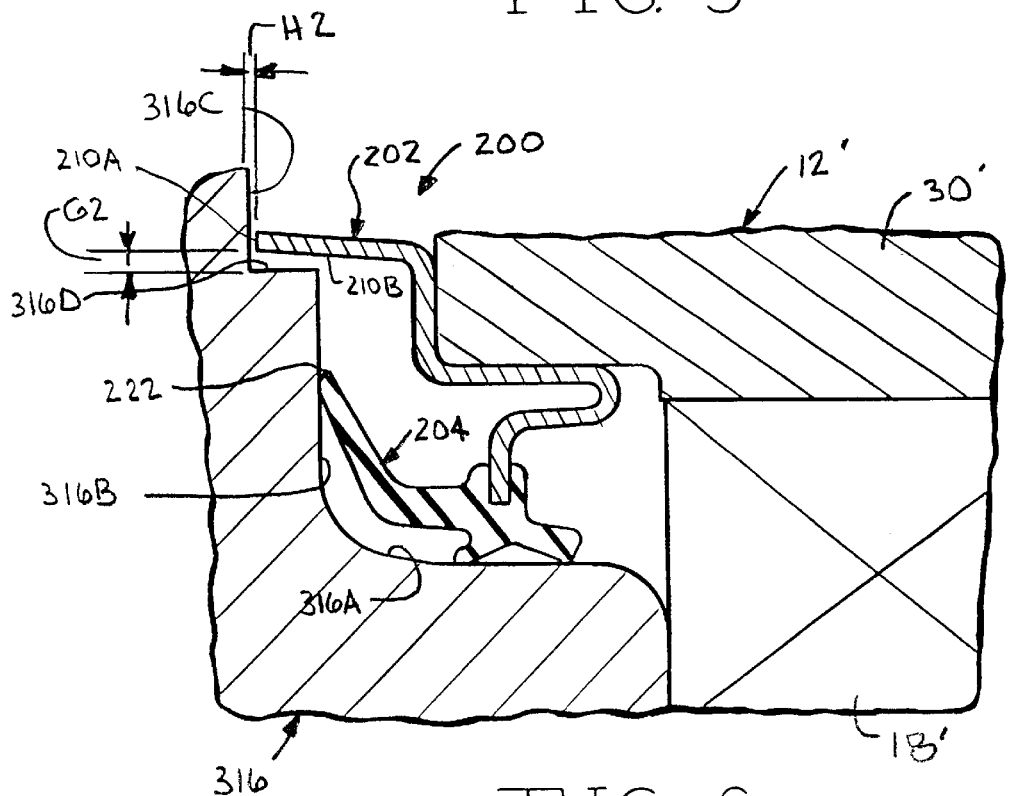
FIG. 6 is an enlarged sectional view of a portion of a vehicle wheel end assembly including the shield and seal assembly illustrated in FIG. 4, showing deflection of the shield and seal assembly when the wheel end assembly is in a maximum deflection of lip position.

Referring now to FIGS. 4–6 and using like reference numbers to indicate like parts, there is illustrated a second embodiment of a shield and seal assembly 200 constructed in accordance with the present invention. As shown in FIG. 4, the shield and seal assembly 200 includes a generally non-flexible shield 202 and a generally flexible seal 204 which are secured together during a molding process. The shield 202 is formed from a relatively non-flexible or rigid material, such as for example, steel. If so desired, the shield 202 can be coated with an anti-corrosive outer layer of material, such as for example, gold bond or galvanizing. Alternatively, the shield 202 can be formed from other materials, such as for example, stainless steel, aluminum and titanium.

As best shown in FIG. 4, the shield 202 includes a first leg 210, a second leg 212, a third leg 214, a fourth leg 216, and a fifth leg 218. The first leg 210 extends in a generally radially outwardly extending direction, the second leg 212 extends in a generally radial direction, the third leg 214 extends in a generally axial direction, the fourth leg 216 extends in a generally axial direction, and the fifth leg 218 extends in a generally radial direction. In the illustrated embodiment, the first leg 210 extends at an angle A1 relative to the second leg 212, the second leg 212 extends at an angle B1 relative to the third leg 214, the third leg 214 and the fourth leg 216 are generally parallel to one another, and the fifth leg 218 and the second leg 212 are generally parallel to one another. The angle A1 is in the range from about 80 degrees to about 90 degrees and preferably (as illustrated) is approximately 85 degrees. The angle B1 is approximately 90 degrees. The third leg 214 defines a generally axial distance C1. Alternatively, the construction of the shield 202 can be other than illustrated if so desired.

The seal 204 is formed from a generally flexible material, such as for example, an elastomeric material. More preferably the seal 204 is formed from nitrile rubber, which is commercially available from Chicago Rawhide Corporation, of Elgin, Ill., under the name of HMADL16. The seal 204 includes a first end portion 220, a second end portion 222, and an intermediate body 224 connecting the first end portion 220 and the second end portion 222 together. The first end portion 220 defines a grease lip of the seal 204, and the second end portion 222 defines an axial or first dust lip of the seal 204. The body 224 includes a generally radially inwardly extending portion 226 which defines a second dust lip of the seal 204, and an outer portion 228 having an annular groove or recess 230 provided therein. An end portion 232 of the fifth leg 218 of the shield 202 is disposed in the recess 230 of the shield 202. Alternatively, other constructions can be used to secure the shield 202 and the seal 204 together.

As best shown in FIG. 5, the shield and seal assembly 200 is disposed in a first cylindrical surface 346 of a wheel hub 300 of a wheel end assembly 310 in accordance with the present invention. In particular, an inner surface 214A of the third leg 214 of the shield 202 is disposed adjacent the first cylindrical surface 346, an inner surface 212A of the first leg 212 of the shield 202 is disposed adjacent an outer opened end 342 of the wheel hub 300, portions of the axial dust lip 222 of the seal 204 are disposed in contact with a generally radially extending surface 316B of the steering knuckle 316, and portions of the grease lip 220 and the second dust lip 226 of the seal 204 are disposed in contact with a generally cylindrical surface 316A of a steering knuckle 316.

Also, as best shown in FIG. 5, an axial endmost surface 210A of the first leg 210 of the shield 202 extends past a surface 316B of the steering knuckle 316. In particular, the axial endmost surface 210A of the shield 202 is spaced a predetermined axial distance H1 from a surface 316C of the steering knuckle 316, and an outer surface 210B of the shield 202 extends a predetermined radial distance G1 from a surface 316D of the steering knuckle 316. As a result of this, as shown in FIG. 6, when a maximum deflection of the lip 222 has occurred, the endmost surface 210A of the shield 202 is maintained spaced apart from contact with the surface 316C of the steering knuckle 316 by an axial distance H2, and the outer surface 210B of the shield 202 is maintained spaced apart from contact with the surface 316D of the steering knuckle 316 by a radial distance G2. As used herein, the term "maximum deflection of lip position" means the maximum deflection of the axial lip 222 of the seal 204 when the component parts of the associated wheel end assembly are in their maximum or worse stack up condition. The term "minimum deflection of lip position" means the minimum deflection of the axial lip 222 of the seal 204 when the component parts of the associated wheel end assembly are in their minimum stack up condition. Also, as shown in FIG. 6, the axial lip 222 of the seal 202 is deflected radially outwardly but is maintained in contact with the surface 316B of the steering knuckle 316.

Figure 7:
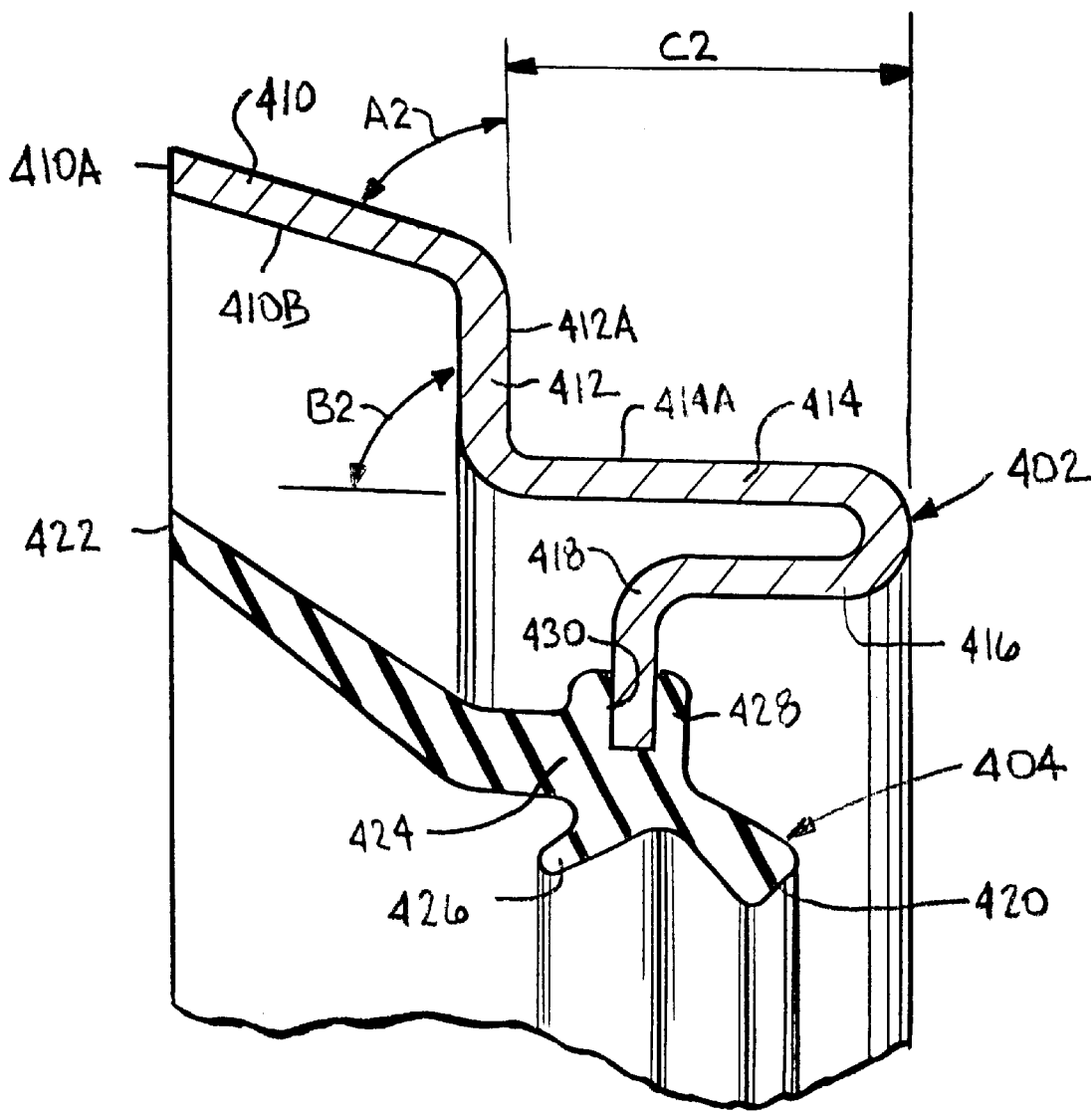
FIG. 7 an enlarged sectional view of a third embodiment of a shield and seal assembly adapted for use in a vehicle wheel end assembly in accordance with the present invention.
Figure 8:
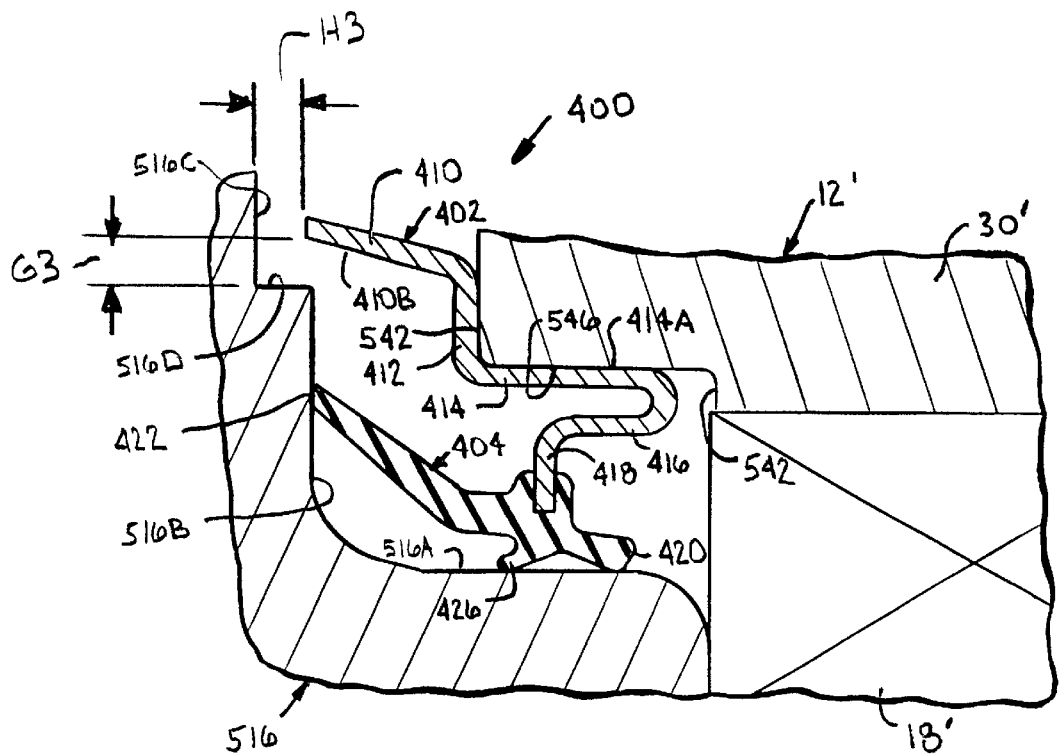
FIG. 8 is an enlarged sectional view of a portion of a vehicle wheel end assembly including the shield and seal assembly illustrated in FIG. 7, showing the deflection of the shield and seal assembly when the wheel end assembly is in a minimum deflection of lip position.
Figure 9:
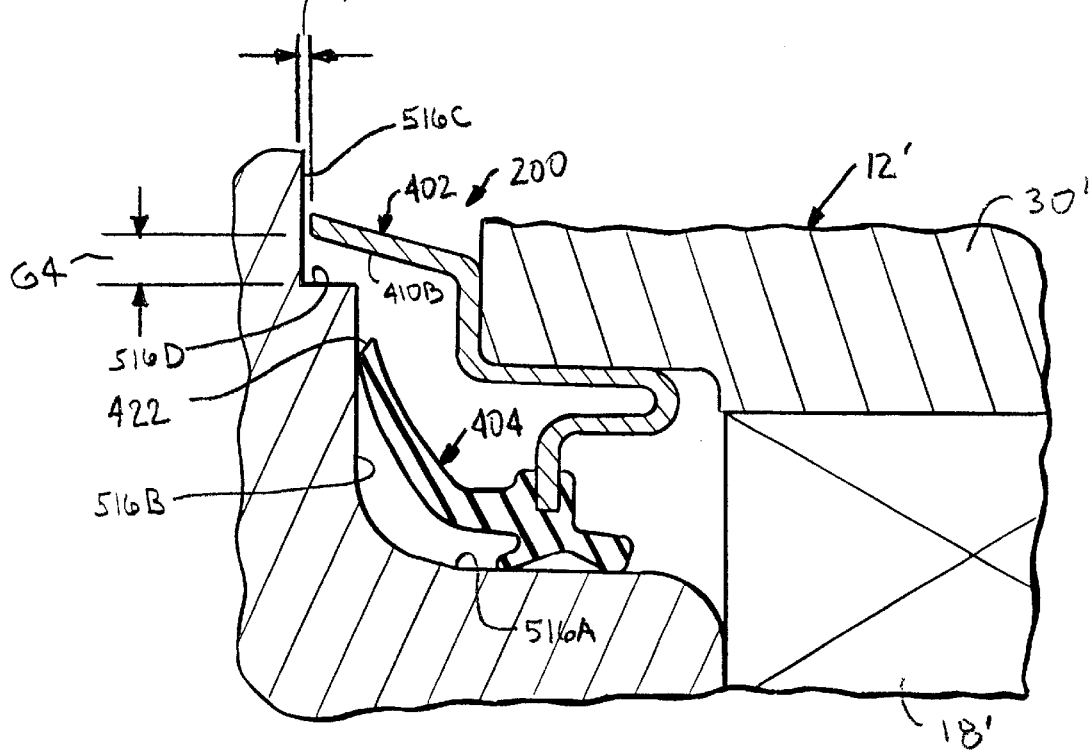
FIG. 9 is an enlarged sectional view of a portion of a vehicle wheel end assembly including the shield and seal assembly illustrated in FIG. 7, showing deflection of the shield and seal assembly when the wheel end assembly is in a maximum deflection of lip position.
Figure 10:
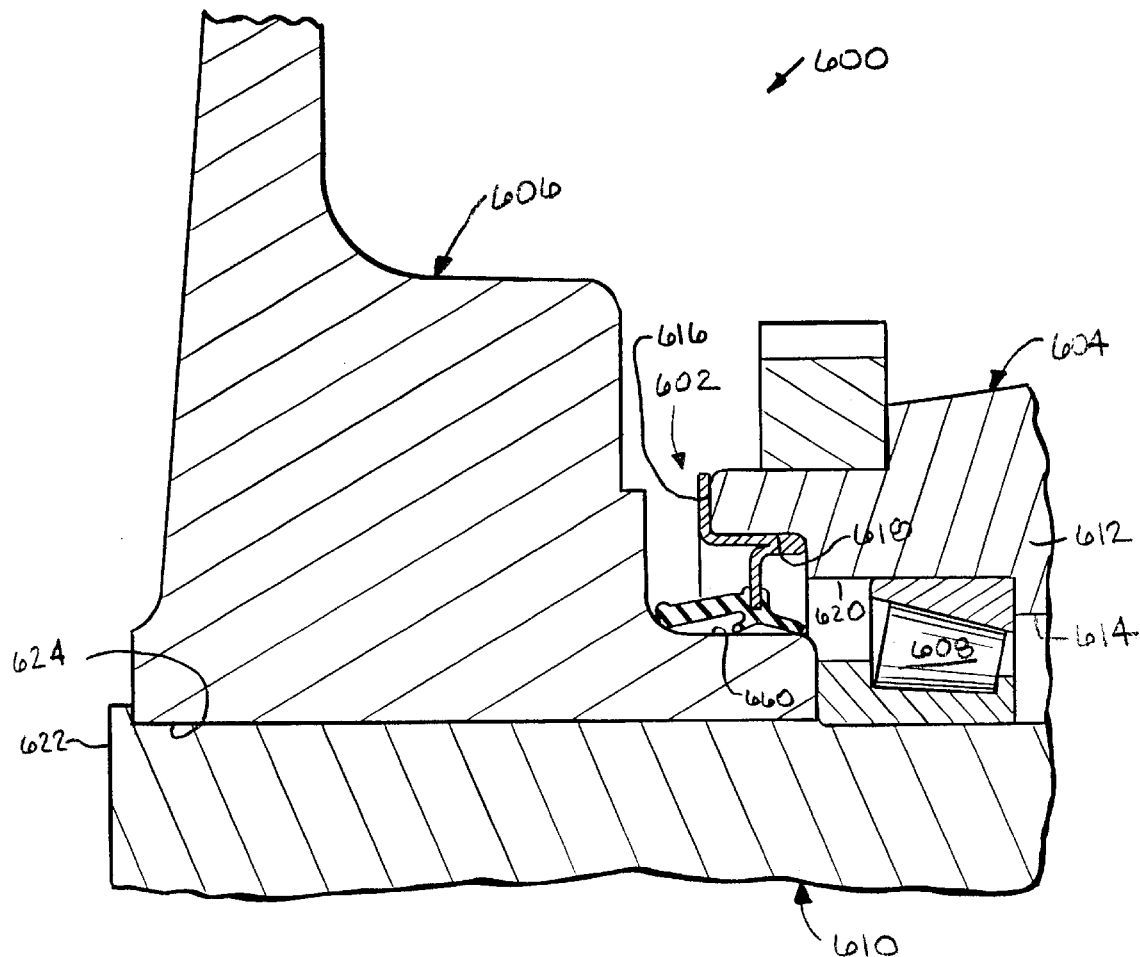
FIG. 10 is a sectional view of a portion of a prior art wheel end assembly including a prior art shield and seal assembly.
Figure 11:
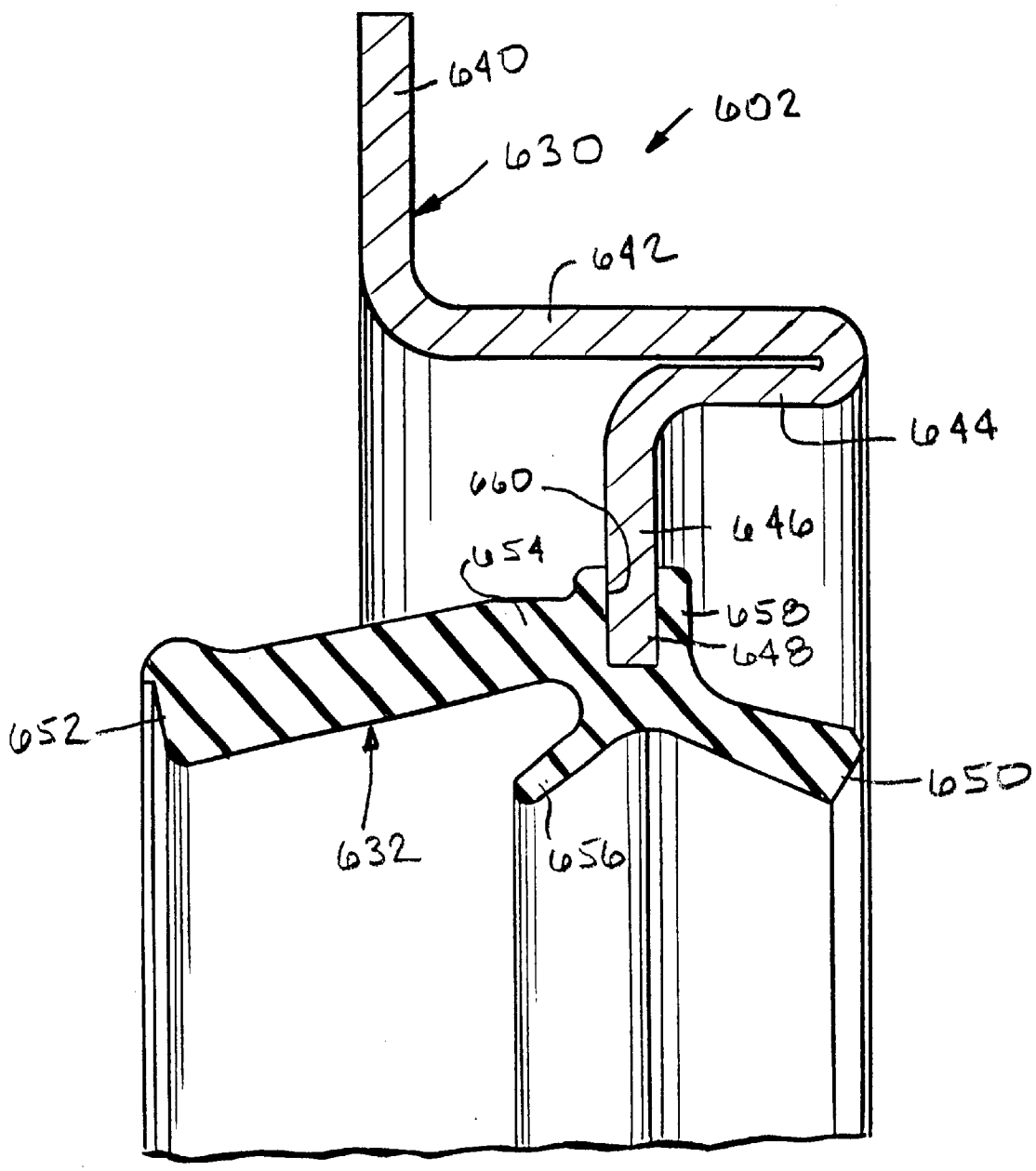
FIG. 11 is an enlarged sectional view of the prior art shield and seal assembly illustrated in FIG. 10.

Referring now to FIGS. 7–9 and using like reference numbers to indicate like parts, there is illustrated a second embodiment of a shield and seal assembly 300 constructed in accordance with the present invention. As shown in FIG. 4, the shield and seal assembly 400 includes a generally non-flexible shield 402 and a generally flexible seal 404 which are secured together during a molding process. The shield 402 is formed from a relatively non-flexible or rigid material, such as for example, steel. If so desired, the shield 402 can be coated with an anti-corrosive outer layer of material, such as for example, gold bond or galvanizing. Alternatively, the shield 402 can be formed from other materials, such as for example, stainless steel, aluminum and titanium.

As best shown in FIG. 7, the shield 402 includes a first leg 410, a second leg 412, a third leg 414, a fourth leg 416, and a fifth leg 418. The first leg 410 extends in a generally radially outwardly extending direction, the second leg 412 extends in a generally radial direction, the third leg 414 extends in a generally axial direction, the fourth leg 416 extends in a generally axial direction, and the fifth leg 418 extends in a generally radial direction. In the illustrated embodiment, the first leg 410 extends at an angle A2 relative to the second leg 412, the second leg 412 extends at an angle B2 relative to the third leg 414, the third leg 414 and the fourth leg 416 are generally parallel to one another, and the fifth leg 418 and the second leg 412 are generally parallel to one another. The angle A2 is in the range from about 80 degrees to about 90 degrees and preferably (as illustrated) is approximately 85 degrees. The angle B2 is approximately 90 degrees. The third leg 414 defines a generally axial distance C2. Alternatively, the construction of the shield 402 can be other than illustrated if so desired.

The seal 404 is formed from a generally flexible material, such as for example, an elastomeric material. More preferably the seal 404 is formed from nitrile rubber, which is commercially available from Chicago Rawhide Corporation, of Elgin, Ill., under the name of HMADL16. The seal 404 includes a first end portion 420, a second end portion 422, and an intermediate body 424 connecting the first end portion 420 and the second end portion 422 together. The first end portion 420 defines a grease lip of the seal 404, and the second end portion 422 defines an axial or first dust lip of the seal 404. The body 424 includes a generally radially inwardly extending portion 426 which defines a second dust lip of the seal 402, and an outer portion 428 having an annular groove or recess 430 provided therein. An end portion 432 of the fifth leg 418 of the shield 402 is disposed in the recess 430 of the seal 404. Alternatively, other constructions can be used to secure the shield 402 and the seal 404 together.

As best shown in FIG. 8, the shield and seal assembly 400 is disposed in a first cylindrical surface 546 of a wheel hub 500 of a wheel end assembly 510 in accordance with the present invention. In particular, an inner surface 414A of the third leg 414 of the shield 402 is disposed adjacent the first cylindrical surface 546, an inner surface 412A of the first leg 412 of the shield 402 is disposed adjacent an outer opened end 542 of the wheel hub 500, portions of the axial lip 422 of the seal 404 are disposed in contact with a generally radially extending surface 516B of the steering knuckle 516, and portions of the grease lip 420 and the second dust lip 426 of the seal 404 are disposed in contact with a generally cylindrical surface 516A of a steering knuckle 516.

Also, as best shown in FIG. 8, an axial endmost surface 410A of the first leg 410 of the shield 402 extends past a surface 516B of the steering knuckle 516. In particular, the axial endmost surface 410A of the shield 402 is spaced a predetermined axial distance H3 from a surface 516C of the steering knuckle 516, and an outer surface 410B of the shield 402 extends a predetermined radial distance G3 from a surface 516D of the steering knuckle 516. As a result of this, as shown in FIG. 9, when maximum deflection of the lip 422 has occurred, the endmost surface 410A of the shield 402 is maintained spaced apart from contact with the surface 516C of the steering knuckle 516 by an axial distance H4, and the outer surface 410B of the shield 402 is maintained spaced apart from contact with the surface 516D of the steering knuckle 516 by a radial distance G4. Also, as shown in FIG. 9, the outer leg or lip 422 of the seal 402 is deflected radially outwardly but is maintained in contact with the surface 516B of the steering knuckle 516.

Although the invention has been described and illustrated in connection with the particular vehicle wheel end assembly 10 disclosed herein, it will be appreciated that this invention may be used in other types of vehicle wheel end assemblies and components thereof. For example, the wheel hub may be of a different construction, the brake assembly may be of a different construction, and/or the bearings may be of a different construction if so desired.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A shield and seal assembly adapted for use in a wheel end assembly of a vehicle comprising:

a generally non-flexible shield including a first leg, a second leg, a third leg, a fourth leg, and a fifth leg, said first leg extending in a generally radially outwardly extending direction, said second leg extending in a generally radial direction, said third leg extending in a generally axial direction, said fourth leg extending in a generally axial direction, said fifth leg extending in a generally radial direction; and a generally flexible seal joined to said shield and adapted to contact an associated first surface of a steering knuckle of the wheel end assembly, said seal including a first end portion, a second end portion, and an intermediate body connecting said first end portion and said second end portion together, said first end portion defining a grease lip of said seal, said second end portion defining a first dust lip of said seal, said body including a generally radially inwardly extending portion which defines a second dust lip and an outer portion having an annular groove provided therein, said fifth leg of said shield including an end portion adapted to be disposed in said groove;

wherein said first leg of said shield includes a remote first end and an opposite second end which provides a transition of said first leg to said second leg, at least a portion of said first leg being spaced apart from and extending at an angle with respect to an associated second surface of the steering knuckle of the wheel end assembly so as to define a generally gradually increasing opening between said first leg and the associated second surface of the steering knuckle along said first leg so as to more freely enable debris which has accumulated in the area of the shield assembly to be discharged therefrom through said opening, a maximum opening being defined between said first leg and the associated second surface of the steering knuckle at said remote first end of said first leg.

2. The shield and seal assembly according to claim 1 wherein said first leg extends at an angle from about 80 degrees to less than 90 degrees relative to said second leg.

3. The shield and seal assembly according to claim 1 wherein said second leg extends at an angle of about 90 degrees relative to said third leg.

4. The shield and seal assembly according to claim 1 wherein said third leg and said fourth leg are generally parallel to one another.

5. The shield and seal assembly according to claim 1 wherein said first leg extends at an angle from about 80 degrees to less than 90 degrees relative to said second leg, said second leg extends at an angle of about 90 degrees relative to said third leg, and said third leg and said fourth leg are generally parallel to one another.

6. The shield and seal assembly according to claim 1 wherein said first leg includes an endmost surface, said second leg and said fifth leg extending generally parallel to one another and said first leg and said fifth leg extending at an angle of less than 90 degrees with respect to each other.

7. A shield and seal assembly adapted for use in a wheel end assembly of a vehicle comprising:
 a generally non-flexible shield including at least an innermost leg and an outermost leg, said innermost leg extending in a generally radial direction and said outermost leg extending in a generally radially outwardly extending direction, said innermost leg and said outermost leg extending at an angle of less than 90 degrees with respect to each other; and
 a generally flexible seal integrally molded in situ with said shield and adapted to contact an associated first surface of a steering knuckle of the wheel end assembly, said seal including a first end portion, a second end portion, and an intermediate body connecting said first end portion and said second end portion together, said first end portion defining a grease lip of said seal, said second end portion defining a first dust lip of said seal, said body including a generally radially inwardly extending portion which defines a second dust lip of said seal;
 wherein said outermost leg of said shield is spaced apart from and extends at an angle with respect to an associated second surface of the steering knuckle of the wheel end assembly so as to define a generally gradually increasing opening between said first leg and the associated second surface of the steering knuckle along said first leg so as to more freely enable debris which has accumulated in the area of the shield assembly to be discharged therefrom through said opening, a maximum opening being defined between said first leg and the associated second surface of the steering knuckle at a remote end of said first leg.

8. The shield and seal assembly according to claim 7 wherein said outermost leg is a first leg, said innermost leg is a fifth leg, said shield further including a second leg, a third leg, and a fourth leg, said second leg extending in a generally radial direction, said third leg extending in a generally axial direction, and said fourth leg extending in a generally axial direction.

9. The shield and seal assembly according to claim 8 wherein said first leg extends at an angle from about 80 degrees to less than 90 degrees relative to said second leg.

10. The shield and seal assembly according to claim 8 wherein said second leg extends at an angle of about 90 degrees relative to said third leg.

11. The shield and seal assembly according to claim 8 wherein said third leg and said fourth leg are generally parallel to one another.

12. The shield and seal assembly according to claim 8 wherein said first leg extends at an angle from about 80 degrees to less than 90 degrees relative to said second leg, said second leg extends at an angle of about 90 degrees relative to said third leg, said third leg and said fourth leg are generally parallel to one another, and said fifth leg and said second leg are generally parallel to one another.

13. A shield adapted for use in a shield and seal assembly of a wheel end assembly of a vehicle comprising:
 a generally non-flexible shield including at least an innermost leg and an outermost leg, said innermost leg extending in a generally radial direction and said outermost leg extending in a generally radially outwardly extending direction, said innermost leg and said outermost leg extending at an angle of less than 90 degrees with respect to each other;
 wherein said outermost leg of said shield is spaced apart from and extends at an angle with respect to an associated surface of the steering knuckle of the wheel end assembly so as to define a generally gradually increasing opening between said first leg and the associated surface of the steering knuckle along said first leg so as to more freely enable debris which has accumulated in the area of the shield assembly to be discharged therefrom through said opening, a maximum opening being defined between said first leg and the associated surface of the steering knuckle at a remote end of said first leg.

14. The shield according to claim 13 wherein said outermost leg is a first leg, said innermost leg is a fifth leg, said shield further including a second leg, a third leg, and a fourth leg, said second leg extending in a generally radial direction, said third leg extending in a generally axial direction, and said fourth leg extending in a generally axial direction.

15. The shield according to claim 14 wherein said first leg extends at an angle from about 80 degrees to less than 90 degrees relative to said second leg.

16. The shield according to claim 14 wherein said third leg and said fourth leg are generally parallel to one another.

* * * * *